United States Patent
Sumiyama (10) Patent No.: US 8,080,339 B2
(45) Date of Patent: Dec. 20, 2011

(54) GELLED NEGATIVE ELECTRODE FOR ALKALINE BATTERY AND ALKALINE BATTERY

(75) Inventor: Shinichi Sumiyama, Osaka (JP)

(73) Assignee: Panasonic Corporation, Osaka (JP)

(*) Notice: Subject to any disclaimer, the term of this patent is extended or adjusted under 35 U.S.C. 154(b) by 508 days.

(21) Appl. No.: 12/269,573

(22) Filed: Nov. 12, 2008

(65) Prior Publication Data

US 2009/0226815 A1  Sep. 10, 2009

(30) Foreign Application Priority Data

Mar. 10, 2008  (JP) ................. 2008-059077

(51) Int. Cl.
*H01M 6/14* (2006.01)

(52) U.S. Cl. .......... 429/229; 429/303; 429/206
(58) Field of Classification Search .......... 429/303, 429/206, 229
See application file for complete search history.

(56) References Cited

U.S. PATENT DOCUMENTS

| | | | |
|---|---|---|---|
| 6,667,133 B1 | 12/2003 | Sumiya et al. | |
| 2004/0170900 A1 | 9/2004 | Sumiya et al. | |
| 2005/0106461 A1 | 5/2005 | Moore et al. | |
| 2005/0181278 A1 | 8/2005 | Cui et al. | |
| 2007/0106060 A1 | 5/2007 | Matsushima et al. | |
| 2007/0141466 A1 | 6/2007 | Shimamura et al. | |
| 2007/0231703 A1* | 10/2007 | Ohtani et al. .............. 429/300 | |

FOREIGN PATENT DOCUMENTS

| EP | 1 162 676 A1 | 12/2001 |
|---|---|---|
| EP | 1 427 040 A1 | 6/2004 |
| JP | 08-078017 | 3/1996 |
| JP | 2000-306589 | 11/2000 |
| JP | 2003-123763 | 4/2003 |
| JP | 2005-310616 | 11/2005 |
| JP | 2005-332811 | 12/2005 |
| WO | WO 2004/083262 A1 | 9/2004 |

OTHER PUBLICATIONS

European Search Report issued in European Patent Application No. 08169430.9, mailed Jul. 29, 2009.
Japanese Notice of Reasons for Rejection, w/ English translation thereof, issued in Japanese Patent Application No. JP 2008-059077 dated Sep. 14, 2010.

* cited by examiner

*Primary Examiner* — Jane Rhee
(74) *Attorney, Agent, or Firm* — McDermott Will & Emery LLP (57) ABSTRACT

A gelled negative electrode contains zinc powder, alkaline electrolyte, and a gelling agent. The specific surface area of the zinc powder is in the range between 0.025 and 0.045 m$^2$/g. The gelling agent contains, as a main component, a cross-linked polymer formed by radical polymerization in a non-benzene solvent, specifically, a cross-linked poly(meth)acrylic acid (or salt) formed by radical polymerization of a (meth)acrylic acid (or slat) in a non-benzene solvent.

14 Claims, 8 Drawing Sheets

| Samples | Gelling agent | | | Alkaline electrolyte Mixed ratio (B) | Alloy powder Mixed ratio (C) | Viscosity (Pa·s) | Separating electrolyte (%) |
|---|---|---|---|---|---|---|---|
| | Polymerization solvent | Brand | Mixed ratio (A) | | | | |
| A-1 | Non-benzene | HV-505E | 1.84 | 100 | 180 | 33~37 | 2.8 |
| A-2 | | PW-350 | 1.78 | | | | 2.3 |
| A-3 | Benzene | Carbopol940 | 1.62 | | | | 0.2 |
| A-4 | | PW-150 | 1.50 | | | | 0.1 |
| A-5 | Non-benzene | HV-505E | 2.38 | | | 43~47 | 2.1 |
| A-6 | | PW-350 | 2.32 | | | | 1.7 |
| A-7 | Benzene | Carbopol940 | 2.10 | | | | 0.1 |
| A-8 | | PW-150 | 2.00 | | | | 0.1 |
| A-9 | Non-benzene | HV-505E | 2.93 | | | 53~57 | 1.4 |
| A-10 | | PW-350 | 2.88 | | | | 1.1 |
| A-11 | Benzene | Carbopol940 | 2.67 | | | | 0 |
| A-12 | | PW-150 | 2.56 | | | | 0 |

| Samples | Gelling agent | | | Alkaline electrolyte Mixed ratio(B) | Alloy powder Specific surface area (m²/g) | Alloy powder Mixed ratio(C) | Viscosity (Pa·s) | Separating electrolyte (%) | Number of batteries in which voltage drop is caused (counts) |
|---|---|---|---|---|---|---|---|---|---|
| | Polymerization solvent | Brand | Mixed ratio(A) | | | | | | |
| B-1 | Non-benzene | HV-505E | 2.71 | 100 | 0.02 | 180 | 43~47 | 0 | 0 |
| B-2 | Benzene | PW-350 | 2.64 | | | | | 0 | 0 |
| B-3 | Benzene | Carbopol940 | 2.39 | | | | | 0 | 0 |
| B-4 | Benzene | PW-150 | 2.28 | | | | | 0 | 0 |
| B-5 | Non-benzene | HV-505E | 2.67 | | 0.025 | | | 0 | 0 |
| B-6 | Non-benzene | PW-350 | 2.60 | | | | | 0 | 0 |
| B-7 | Benzene | Carbopol940 | 2.35 | | | | | 0 | 0 |
| B-8 | Benzene | PW-150 | 2.24 | | | | | 0 | 0 |
| B-9 | Non-benzene | HV-505E | 2.62 | | 0.03 | | | 0 | 0 |
| B-10 | Non-benzene | PW-350 | 2.55 | | | | | 0 | 0 |
| B-11 | Benzene | Carbopol940 | 2.31 | | | | | 0 | 0 |
| B-12 | Benzene | PW-150 | 2.20 | | | | | 0 | 0 |
| B-13 | Non-benzene | HV-505E | 2.50 | | 0.04 | | | 0 | 0 |
| B-14 | Non-benzene | PW-350 | 2.44 | | | | | 0 | 0 |
| B-15 | Benzene | Carbopol940 | 2.21 | | | | | 0 | 0 |
| B-16 | Benzene | PW-150 | 2.10 | | | | | 0 | 0 |
| B-17 | Non-benzene | HV-505E | 2.44 | | 0.045 | | | 0.3 | 0 |
| B-18 | Non-benzene | PW-350 | 2.38 | | | | | 0.2 | 0 |
| B-19 | Benzene | Carbopol940 | 2.15 | | | | | 0 | 0 |
| B-20 | Benzene | PW-150 | 2.05 | | | | | 0 | 0 |
| B-21 | Non-benzene | HV-505E | 2.38 | | 0.05 | | | 2.1 | 6 |
| B-22 | Non-benzene | PW-350 | 2.32 | | | | | 1.7 | 4 |
| B-23 | Benzene | Carbopol940 | 2.10 | | | | | 0.1 | 0 |
| B-24 | Benzene | PW-150 | 2.00 | | | | | 0.1 | 0 |

| Samples | Gelling agent (thickening agent/adsorbent polymer) | | | | | | Alkaline electrolyte | Zinc powder | | | Viscosity (Pa·s) | Separating electrolyte (%) | Number of batteries in which voltage drop is caused (counts) |
|---|---|---|---|---|---|---|---|---|---|---|---|---|---|
| | Thickening agent | | | Adsorbent polymer | | | Mixed ratio (B) | Specific surface area (m²/g) | Alloy composition Mixed ratio (C) | | | | |
| | Polymerization solvent | Brand | Mixed ratio (A1) | Solvent | Brand | Mixed ratio (A2) | | | | | | | |
| Example1 | Non-benzene | HV-505E | 0.81 | Non-benzene | DK-500B | 1.62 | 100 | 0.025 | 180 | | 38 | 0.0 | 0 |
| Example2 | | | | | | | | 0.03 | | | 42 | 0.0 | 0 |
| Example3 | | | | | | | | 0.035 | | | 45 | 0.0 | 0 |
| Example4 | | | | | | | | 0.04 | | | 49 | 0.0 | 0 |
| Example5 | | | | | | | | 0.045 | | | 62 | 0.3 | 0 |
| Comparative Example 1 | | | | | | | | 0.05 | | | 70 | 1.2 | 2 |
| Example6 | | PW-350 | 0.77 | | | 1.54 | | 0.025 | | | 39 | 0.0 | 0 |
| Example7 | | | | | | | | 0.03 | | | 42 | 0.0 | 0 |
| Example8 | | | | | | | | 0.035 | | | 45 | 0.0 | 0 |
| Example9 | | | | | | | | 0.04 | | | 48 | 0.0 | 0 |
| Example10 | | | | | | | | 0.045 | | | 61 | 0.2 | 0 |
| Comparative Example 2 | | | | | | | | 0.05 | | | 70 | 1.1 | 3 |
| Reference Example 1 | Benzene | Carbopol1940 | 0.70 | | | 1.40 | | 0.035 | | | 49 | 0.0 | 0 |
| Reference Example 2 | | | | | | | | 0.05 | | | 73 | 0.3 | 0 |
| Reference Example 3 | | PW-150 | 0.70 | | | | | 0.035 | | | 49 | 0.0 | 0 |
| Reference Example 4 | | | | | | | | 0.05 | | | 76 | 0.3 | 0 |

FIG. 7

| Samples | Gelling agent (thickening agent/adsorbent polymer) | | | | | | Alkaline electrolyte | Zinc powder | | | | | | | Viscosity (Pa·s) | Separating electrolyte (%) | Number of batteries in which voltage drop is caused (counts) | Discharge performance (DSCmode) (cycles) |
|---|---|---|---|---|---|---|---|---|---|---|---|---|---|---|---|---|---|---|
| | Thickening agent | | | Adsorbent polymer | | | Mixed ratio (B) | Specific surface area (m²/g) | Average particle diameter (μm) | Alloy composition (ppm) | | | Mixed ratio (C) | | | | |
| | Polymerization solvent | Brand | Mixed ratio (A1) | Solvent | Brand | Mixed ratio (A2) | | | | In | Bi | Al | | | | | |
| Example11 | Non-benzene | HV-505E | 0.81 | Non-benzene | DK-500B | 1.62 | 100 | 0.035 | 176 | 200 | | 0 | 180 | 43 | 0.0 | 0 | 100 |
| Example12 | | | | | | | | | 165 | | | 25 | | 43 | 0.0 | 0 | 105 |
| Example13 | | | | | | | | | 158 | | 135 | 60 | | 45 | 0.0 | 0 | 107 |
| Example14 | | | | | | | | | 147 | | | 100 | | 50 | 0.0 | 0 | 109 |
| Example15 | | | | | | | | | 145 | | | 150 | | 53 | 0.0 | 0 | 109 |
| Example16 | | | | | | | | | 143 | | 40 | 60 | | 53 | 0.0 | 0 | 108 |
| Example17 | | | | | | | | | 158 | | 135 | | | 45 | 0.0 | 0 | 107 |
| Example18 | | | | | | | | | 163 | | 150 | | | 43 | 0.0 | 0 | 105 |
| Example19 | | | | | | | | | 171 | | 250 | | | 42 | 0.0 | 0 | 102 |
| Example20 | | | | | | | | | 181 | | 500 | | | 40 | 0.0 | 0 | 100 |

FIG. 8

| Samples | Gelling agent (thickening agent/adsorbent polymer) | | | | | | Alkaline electrolyte | Zinc powder | | | | | Viscosity (Pa·s) | Separating electrolyte (%) | Particle diameter of adsorbent polymer (μm) | Number of batteries in which voltage drop is caused (counts) | Discharge performance (DSCmode) (cycles) |
|---|---|---|---|---|---|---|---|---|---|---|---|---|---|---|---|---|---|
| | Thickening agent | | | Adsorbent polymer | | | Mixed ratio (B) | Specific surface area (m²/g) | In | Bi | Al | Mixed ratio (C) | | | | | |
| | Polymerization solvent | Brand | Mixed ratio (A1) | Solvent | Brand | Mixed ratio (A2) | | | | | | | | | | | |
| Example21 | Non-benzene | HV-505E | 0.81 | Non-benzene | DK-500B (200μ) | 1.62 | 100 | 0.035 | 200 | 135 | 60 | 180 | 45 | 0.0 | 1.2 | 0/100 | 104 |
| Example22 | | | | | DK-500 (400μ) | | | | | | | | 43 | 0.0 | 2.6 | 0/100 | 107 | ptember
GELLED NEGATIVE ELECTRODE FOR ALKALINE BATTERY AND ALKALINE BATTERY

BACKGROUND OF THE INVENTION

1. Field of the Invention

The present invention relates to a gelled negative electrode for an alkaline battery containing a gelling agent polymerized in a non-benzene solvent and an alkaline battery using it as a negative electrode.

2. Description of Related Art

In general, a gelled negative electrode, which is obtained by gelling a mixture of alkaline electrolyte and zinc powder with an gelling agent added, is used as a negative electrode of an alkaline battery. As the main component of the gelling agent, a cross-linked poly(meth)acrylic acid (or salt) formed by polymerizing a (meth)acrylic acid (or salt) is used in general, wherein the gelled negative electrode is adjusted to have a predetermined viscosity for preventing the zinc powder from sedimenting in the alkaline electrolyte.

When the added amount of the gelling agent is increased, the internal resistance of the battery increases to degrade the discharge characteristics of the battery. When the added amount of the gelling agent is reduced in contrast, sedimentation of the zinc powder is suppressed insufficiently to degrade the discharge characteristics of the battery and to shorten the lifetime thereof.

To tackle these problems, Japanese Unexamined Patent Application Publication 2003-123763 proposes a technique for enhancing the thickening effect of the gelling agent by adding ultra-fine particles of a metal oxide to the gelling agent. This reduces the added amount of the gelling agent required for attaining the predetermined viscosity and prevents degradation of the discharge characteristics caused due to an increase in internal resistance of the battery.

Japanese Unexamined Patent Application Publication 2000-306589 discloses a technique for forming a gelling agent made of a cross-linked poly(meth)acrylic acid (or salt) having a large particle diameter by aqueous solution polymerization or reverse phase suspension polymerization. This suppresses sedimentation of the zinc powder to prevent degradation of the discharge characteristics and shortening of the lifetime of the battery.

SUMMARY OF THE INVENTION

With a view to enhancing the discharge characteristics of a battery, a highly polymerized cross-linked poly(meth)acrylic acid (or salt) is preferable as a gelling agent because a less amount of such the gelling agent is required for attaining the predetermined viscosity.

In polymerizing a (meth)acrylic acid (or salt) by precipitation polymerization, the use of benzene as a polymerization solvent results in a highly polymerized cross-linked poly(meth)acrylic acid (or salt), the reason for which might be as follows.

In polymerization of the (meth)acrylic acid (or salt), which progresses with a radical reaction, two radicals are re-combined to inactivate a growth radical, thereby stopping the growth. When a generally-called chain transfer reaction in which a hydrogen radical is transferred between two radicals is caused, the growth is liable to be stopped.

In a case using benzene as a polymerization solvent, the growth radical must abstract hydrogen directly from the benzene ring, and a radical generated at that time cannot be resonated with the benzene ring to be unstable, thereby hardly causing the chain transfer reaction. As a result, the growth is hardly stopped to obtain a highly polymerized polymer.

Although benzene is thus suitable for achieving high polymerization in a cross-linked poly(meth)acrylic acid (or salt), it involves problems in air pollution, health hazard, and the like. Therefore, a polymerization solvent alternating benzene is demanded. Benzene remains inevitably in the cross-linked polymer after polymerization, which results in that a gelled negative electrode to which this polymer is added as a gelling agent contains benzene. When considering both the gelling agent manufacturing process and the course of distributing an alkaline battery incorporating the gelled negative electrode, application of a polymerizing solution alternating benzene becomes essential.

In the case, however, where a gelled negative electrode is formed with a gelling agent polymerized in a non-benzene solvent for polymerization, the viscosity of the gelled negative electrode is lower than that using the gelling agent polymerized in the benzene solvent for polymerization.

Figure 1:
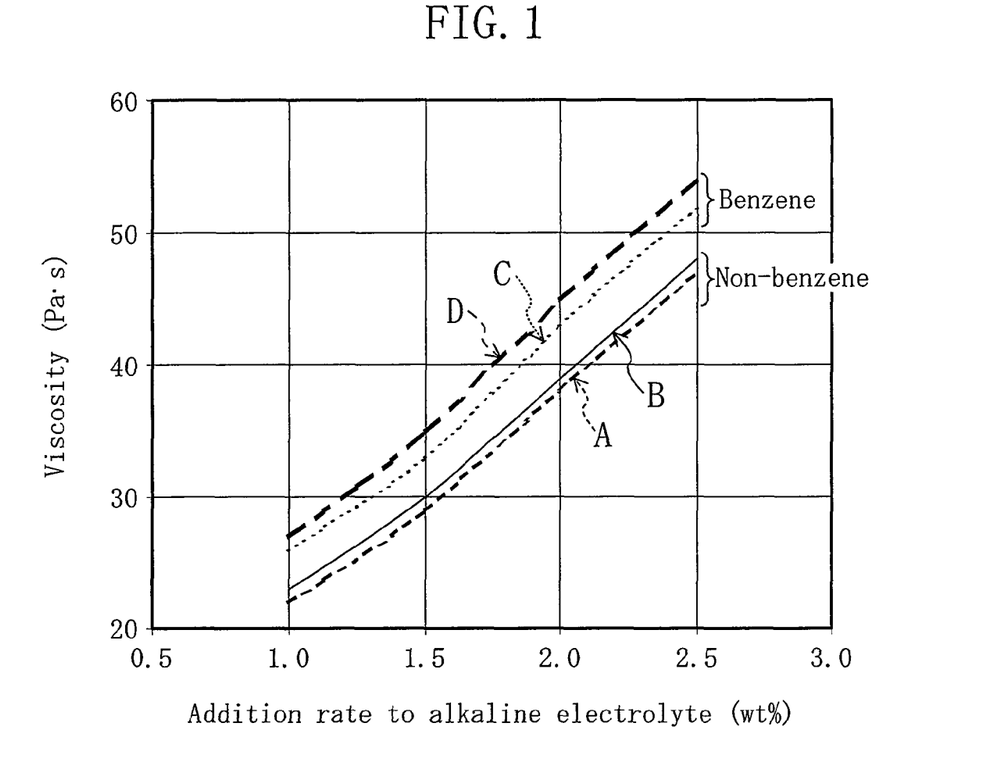
FIG. 1 is a graph showing characteristic curves of the viscosities of gelled negative electrodes in problems that the invention is to solve.

FIG. 1 is a graph showing measurement results of the viscosities of gelled negative electrodes formed with gelling agents polymerized in non-benzene solvents and gelling agents polymerized in benzene solvents with the addition ratios thereof to the alkaline electrolyte changed. Herein, the curves indicated by references A and B in FIG. 1 mean the viscosities of gelled electrodes using gelling agents polymerized in non-benzene solvents (commercially available HV-505E manufactured by SUMITOMO SEIKA CHEMICALS CO., LTD. and PW-350 manufactured by NIHON JUNYAKU Co., Ltd.), respectively, and the curves indicated by references C and D mean the viscosities of the gelled electrodes using gelling agents polymerized in benzene solvents (commercially available Carbopol 940 manufactured by Noveon Inc. and PW-150 manufactured by NIHON JUNYAKU Co., Ltd.).

As shown in FIG. 1, where the addition ratio is the same, the gelled negative electrodes using the gelling agents polymerized in the non-benzene solvents is 3 to 10 Pa·s lower in viscosity than those using the gelling agents polymerized in the benzene solvents. In other words, it is required for obtaining a gelled negative electrode having an equivalent viscosity to add a gelling agent polymerized in a non-benzene solvent at approximately 0.3 to 0.5 wt % more than a gelling agent polymerized in a benzene solvent.

Accordingly, the reason why the use of a gelling agent polymerized in a non-benzene solvent lowers the viscosity of the gelled negative electrode might be that: polymerization of a gelling agent polymerized in a non-benzene solvent is lower than that of a gelling agent polymerized in a benzene solvent. The reason of this can be explained as follows.

When, for example, an aromatic hydrocarbon, such as toluene or xylene is used as a non-benzene solvent for polymerization, the growth radical abstracts hydrogen from the methyl group, so that a radical generated at that time is resonated with the benzene ring to be conjugated and stable, with a result that the chain transfer reaction is liable to be caused. This might lead to stop of the growth to attain low polymerized polymer.

In other words, the use of a non-benzene solvent as a polymerization solvent alternating benzene necessarily means the use of a low polymerized gelling agent and requires therefore to add the gelling agent much more than that in the conventional case for obtaining a gelled negative electrode having the predetermined viscosity. This involves problems of degrading the discharge characteristics of the battery, increasing the manufacture cost, and so on.

The inventor noticed the following problem when various characteristics of gelled negative electrodes formed with gelling agents polymerized in non-benzene solvents were evaluated.

Figure 2:
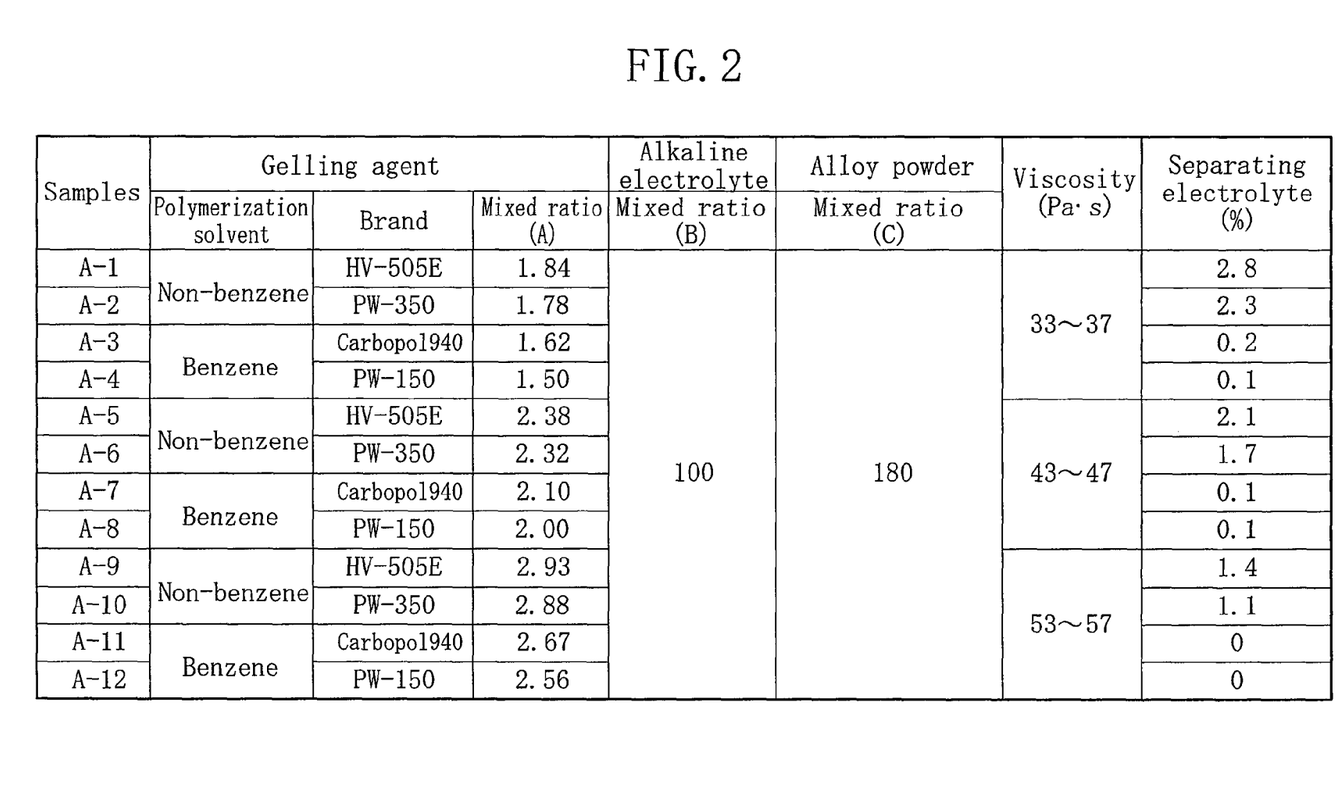
FIG. 2 is a table indicating measurement results of each amount of alkaline electrolyte separating from gelled negative electrodes in problems that the invention is to solve.

FIG. 2 shows measurement results of each amount of the alkaline electrolyte separating from gelled negative electrodes formed by mixing any one of gelling agents (A), the alkaline electrolyte (B), and zinc alloy power (C) at a mixed ratio of A:B:C, wherein the gelling agents are: gelling agents polymerized in non-benzene solvents (commercially available HV-505E manufactured by SUMITOMO SEIKA CHEMICALS, CO., LTD. and PW-350 manufactured by NIHON JUNYAKU Co., Ltd.) and gelling agents polymerized in benzene solvents (commercially available Carbopol 940 manufactured by Noveon Inc. and PW-150 manufactured by NIHON JUNYAKU Co, Ltd).

The viscosities of the gelled negative electrodes were adjusted in the ranges between 33 and 37 Pa·s (samples A-1 to A-4), between 43 and 47 Pa·s (samples A-5 to A-8), and between 53 and 57 Pa·s (samples A-9 to A-12) by changing the mixed ratio of the gelling agents (A). FIG. 2 proves that in order to obtain an equivalent viscosity, the mixed ratio of the gelling agents polymerized in the non-benzene solvents must be set greater than that of the gelling agents polymerized in the benzene solvents.

Each amount of the separating alkaline electrolyte (each weight ratio thereof to the gelling negative electrodes) was measured in such a manner that the gelled negative electrodes were left for 14 days at a temperature of 20° C. and each alkaline electrolyte released in the upper layer parts of the gelled negative electrodes was gathered.

As indicated in FIG. 2, the alkaline electrolyte did not separate from the gelled negative electrodes formed with the gelling agents polymerized in the benzene solvents while it separated from the gelled negative electrodes formed with the gelling agents polymerized in the non-benzene solvents. It was also found that the lower the viscosity of the gelled negative electrode was, the more the alkaline electrolyte separated. The reason why the alkaline electrolyte retention lowered when the gelling agents polymerized in the non-benzene solvents were used might be as follows.

Figure 3A:
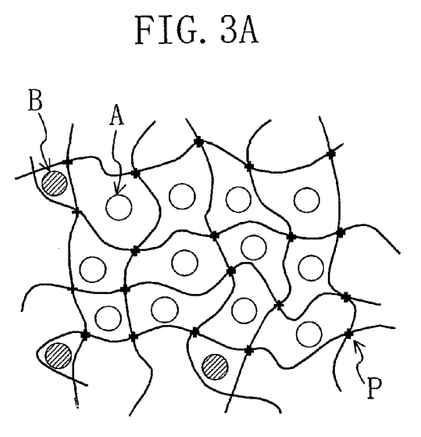
FIG. 3A is a schematic illustration showing a structure of a gelling agent polymerized in a benzene solvent and FIG. 3B is a schematic illustration showing a structure of a gelling agent polymerized in a non-benzene solvent.
Figure 3B:
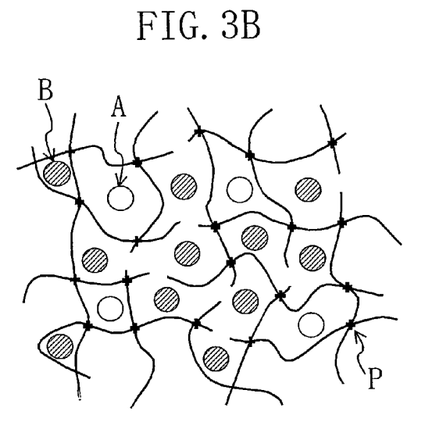

FIG. 3 presents schematic structures of gelling agents (cross-linked poly(meth)acrylic acids (or salts)), wherein FIG. 3A shows a structure of a gelling agent polymerized in a benzene solvent, and FIG. 3B shows a structure of a gelling agent polymerized in a non-benzene solvent.

Reference P arrowed in the drawings denotes a cross-linked point, A denotes alkaline electrolyte captured in a cross-linked space, and B denotes alkaline electrolyte captured at the end pieces of the principal chains. As shown in FIG. 3B, the gelling agent polymerized in the non-benzene solvent has low polymerization and has short principal chains to increase the rate of the alkaline electrolyte (B) captured at the end pieces of the principal chains. As a result, the molecules (B) are more liable to separate from the cross-linking network than the molecule (A). Therefore, the use of the gelling agents polymerized in the non-benzene solvents might readily cause separation of the alkaline electrolyte.

With the alkaline electrolyte liable to separate from the gelled negative electrode, the gelled negative electrode is filled to the battery casing non-uniformly in mass production of the alkaline battery, against which re-stirring of the gelled negative electrode is necessitated at each filling to invite an increase in the number of manufacturing steps, thereby leading to an increase in manufacture cost.

Even if the gelled negative electrode is re-stirred and is then filled into the battery casing, the alkaline electrolyte will separate after filling to increase its flowability at the surface of the gelled negative electrode. This invites leakage of the gelled negative electrode over the separator to the positive electrode when the battery receives an impact upon drop or the like of the battery to cause internal short-circuit.

The present invention has been made in view of the foregoing and has its object of providing a gelled negative electrode for an alkaline battery excellent in liquid retention by containing a gelling agent polymerized in a non-benzene solvent.

A gelled negative electrode for an alkaline battery in accordance with the present invention includes: zinc powder, alkaline electrolyte, and a gelling agent, wherein the gelled negative electrode contains, as a main component, a cross-linked polymer formed by radical polymerization in a non-benzene solvent, and the zinc powder has a specific surface area in a range between 0.025 and 0.045 $m^2/g$.

In a preferred embodiment, the gelling agent contains, as a main component, a cross-linked poly(meth)acrylic acid (or salt) formed by radical polymerization of a (meth)acrylic acid (or slat) in a non-benzene solvent.

Herein, the non-benzene solvent is preferably a low-polar or non-polar hydrocarbon-based solvent. Further, the low-polar or non-polar hydrocarbon-based solvent is preferably made of at least one kind of material selected from a group consisting of n-hexane, cyclohexane, and pentane.

An alkaline battery in accordance with the present invention includes a gelled negative electrode containing zinc powder, alkaline electrolyte, and a gelling agent, wherein the gelled negative electrode contains no benzene, and the zinc powder has a specific surface area in a range between 0.025 and 0.045 $m^2/g$.

In the present invention, the gelling agent formed by radical polymerization in the non-benzene solvent and the zinc powder having a specific surface in the range between 0.025 and 0.045 $m^2/g$ are used, thereby attaining a gelled negative electrode which is excellent in alkaline electrolyte retention and which contains no benzene. Hence, a safety alkaline battery causing no internal short-circuit upon impact to the battery can be manufactured at low cast with no increase in the number of manufacturing steps involved.

BRIEF DESCRIPTION OF THE DRAWINGS

FIG. 3A and FIG. 3B explain liquid retention of the gelled negative electrodes in problems that the invention is to solve, wherein

DETAILED DESCRIPTION OF THE INVENTION

Embodiments of the present invention will be described below with reference the accompanying drawings. The present invention is not limited to the following embodiments.

In the present invention, the term "(meth)acrylic acid . . . " means "acrylic acid . . . " and/or "methacrylic acid . . . " As well, the term " . . . acrylic acid (or salt)" means " . . . acrylic acid" and/or " . . . acrylate." The salt includes alkaline metal salts, such as potassium, sodium, lithium, and the like, alkaline-earth metal salts, such as calcium, and the like. Neutralization of such an acid generates a salt. Neutralization between before and after polymerization makes no difference.

The reason why the alkaline electrolyte retention lowers when a gelling agent polymerized in a non-benzene solvent is used has already been explained. The inventor paid attention to the following point for suppressing the lowering of the liquid retention.

As shown in FIG. 3B, the gelling agent polymerized in the non-benzene solvent has short principal chains to increase the relative amount of the alkaline electrolyte (B) captured at the end pieces of the principal chains. In other words, the alkaline electrolyte retention depends largely on the amount of the alkaline electrolyte captured at the end pieces of the principal chains.

A cross-linked poly(meth)acrylic acid (or salt) formed by polymerization of a (meth)acrylic acid (or salt) has principal chains containing a carboxyl group. The carboxyl group, which is a hydrophilic group, adsorbs and captures water molecules in the alkaline electrolyte and also absorbs zinc. The absorbed amounts of both of them depend on the number of bases of the carboxyl group and is constant.

In view of the foregoing, the inventor noticed that a relative increase in amount of the water molecules (B) in the alkaline electrolyte by relatively reducing the amount of the zinc absorbed by the end pieces of the principal chains can suppresses lowering of the alkaline electrolyte retention.

To do so, the mixed ratio of the zinc to the alkaline electrolyte may be reduced. This, however, invites reduction in discharge capacity as the basic performance of the alkaline battery and is therefore not employable.

The inventor paid attention to the fact that the amount of zinc adsorbed by the end pieces of the principal chains depends on the specific surface area of the zinc powder, thereby achieving suppression of lowering of the alkaline electrolyte retention by minimizing the specific surface area of the zinc powder contained in the gelled negative electrode.

Although minimization of the specific surface area of the zinc powder reduces the reaction surface of the active material to invite degradation of the large current discharge characteristics of the battery, various countermeasures, which will be described later, enable suppression of degradation of the large current discharge characteristics.

Figure 4:
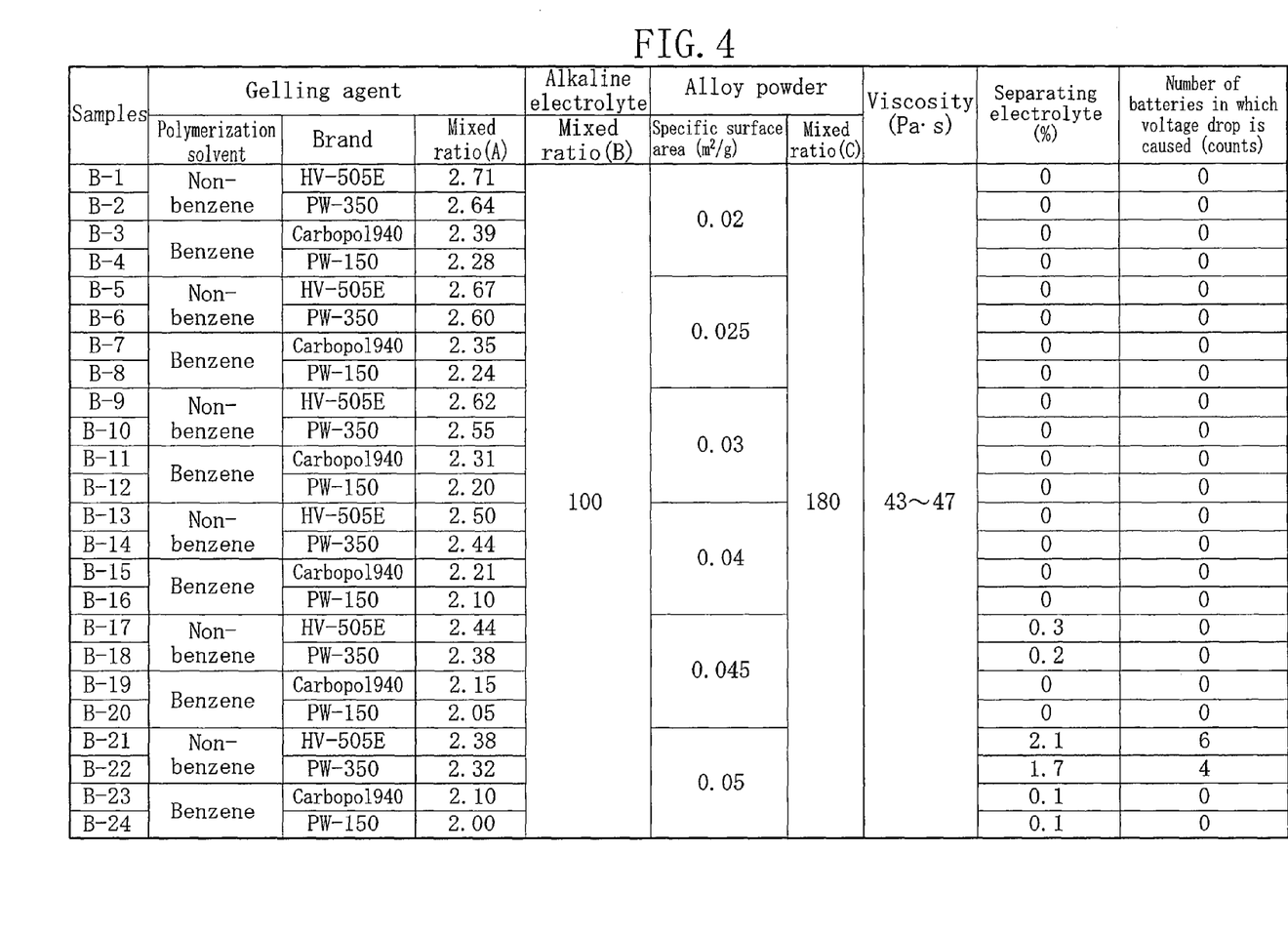
FIG. 4 is a table indicating measurement results of each amount of alkaline electrolyte separating from gelled negative electrodes and each number of batteries in which voltage drop is caused in a drop test of alkaline batteries, wherein the gelled negative electrodes of the alkaline batteries are formed with gelling agents formed by polymerizing a (meth)acrylic acid (or salt) in non-benzene solvents and in benzene solvents.

FIG. 4 indicates measurement results of each amount of alkaline electrolyte separating from gelled negative electrodes and each number of batteries in which voltage drop is caused in a drop test of alkaline batteries, wherein the gelled negative electrodes of the alkaline batteries were formed by mixing, at mixing ratios A:B:C, gelling agents formed by polymerizing a (meth)acrylic acid (or salt) in non-benzene solvents and benzene solvents, the electrolyte, and zinc alloy powders of which the specific surface areas are adjusted to the ranges between 0.02 and 0.05 $m^2/g$.

Herein, the non-benzene solvents and the benzene solvents were the same as those indicated in FIG. 2, and the mixed ratio (A) of each gelling agent was adjusted so that each viscosity of the gelled negative electrodes was substantially the predetermined value (43 to 47 Pa·s). Minimization of the specific surface area of the zinc alloy powder reduces the shearing stress between particles. Therefore, the mixed ratio (A) of the gelling agents were set large as the specific surface area of the zinc powder was small. An alkaline electrolyte of which a ratio of potassium hydrate:zinc oxide:water is 34:2:64 was used.

The specific surface area of the zinc powder can be measured by BET (Brunauer-Emmett-Teller). In the present embodiment, the zinc powder was measured directly with the use of a krypton gas by a pore size distribution and specific area measuring instrument (ASAP-2010 manufactured by SHIMADZU CORPORATION (Shimadzu-Micromeritex)). In order to measure the zinc powder in a battery, it is necessary to decompose the battery and take out the zinc powder from the gelled negative electrode. Further, the zinc powder must be washed well with ion-exchange water of grade A2 or higher specified in JIS K0557, and supernatant liquid of the cleaning liquid is discarded by a gradient method. The washing is repeated until the cleaning liquid becomes neutral, and then, the zinc powder is washed twice or more with methanol (Reagent Grade) and is then dried sufficiently at a temperature of approximately 50° C. Thereafter, the specific surface area of the resultant is measured by the same method.

Each amount of the separating alkaline electrolyte (each weight ratio thereof to the gelled negative electrode) was measured by the same method as in FIG. 2. The drop test of the alkaline batteries was carried out in such a manner that: 20 batteries of which the open circuit voltages have been measured were gravity-dropped from a height of 1.5 m onto a plastic tile; each open circuit voltage after one minute elapse was measured; and batteries in which voltage drop of 5 mV or more was caused were counted. The batteries in which 5 mV or more voltage drop was caused were batteries in which internal short-circuit was caused by leakage of the gelled negative electrode over the separator to the positive electrode upon impact by drop.

As indicated in FIG. 4, a slight amount of the alkaline electrolyte separated in samples B-17 and B-18 in which the gelled negative electrodes were formed with the gelling agents polymerized in the non-benzene solvents and which contain the zinc powder having a specific surface of 0.045 m²/g. In samples (B-21 and B-22) containing the zinc powder having a specific surface area of 0.05 m²/g, the amount of the separating alkaline electrolyte is 1% or more and internal short-circuit was caused by voltage drop in the drop test.

When the amount of the separating alkaline electrolyte is 1% or more, the gelled negative electrode filled in the battery casing becomes non-uniform in mass production of the alkaline battery, against which re-stirring of the gelled negative electrode is necessitated at each filling.

According to the above results, the specific surface area of the zinc powder is preferably set equal to or smaller than 0.045 m²/g for stably filling the gelled negative electrode into the battery casing in mass production and for maintaining the characteristics against drop impact.

When the specific surface area of the zinc powder is reduced, it becomes necessary to set the mixed ratio of the gelling agent large for maintaining the viscosity of the gelled negative electrode at the given value. When doing so, the mixed ratio of the zinc powder reduces relatively to invite lowering of the discharge capacity of the battery. Accordingly, the specific surface area of the zinc powder is preferably set equal to or larger than 0.025 m²/g.

In order to obtain an alkaline battery which is excellent in liquid retention and has large discharge capacity, the specific surface area of the zinc powder is preferably set in the range between 0.03 and 0.04 m²/g.

Thus, in a gelled negative electrode for an alkaline battery containing zinc powder, alkaline electrolyte, and a gelling agent, when the gelling agent contains, as a main component, a cross-linked polymer (a cross-linked poly(meth)acrylic acid (or salt)) formed by radical polymerization in a non-benzene solvent and the specific surface area of the zinc powder is set in the range between 0.025 and 0.045 m²/g, more preferably, between 0.03 and 0.04 m²/g, lowering of the liquid retention of the gelled negative electrode, which is due to employment of the non-benzene solvent as the polymerization solvent, can be suppressed. Hence, a safety alkaline battery in which no internal short-circuit is caused upon impact to the battery can be manufactured at low cost with no increase in the number of manufacturing steps involved.

The gelled negative electrode in the present invention, which contains the gelling agent polymerized in the non-benzene solvent, principally contains no benzene, and accordingly, no problems of air pollution, health hazard, and the like are involved even in the course of distributing an alkaline battery using this negative electrode.

Herein, the wording "a gelled negative electrode containing no benzene" means a gelled negative electrode to which a gelling agent polymerized in a non-benzene solvent is added and excludes a gelled negative electrode to which a gelling agent polymerized in a benzene solvent is added. In the latter gelled negative electrode, benzene inevitably remains in the cross-linked polymer after polymerization.

Residual benzene in the gelled negative electrode to which the gelling agent polymerized in the benzene solvent is added can be determined by measuring it by head space gas chromatography (HSGC). For example, ion exchange water of 8 ml is injected into a HSGC glass bottle and a reagent liquid at a known concentration obtained by solving a predetermined amount of benzene of Reagent Grade is measured under the following HSGC analysis conditions to obtain a calibration curve. Next, after the weight of a predetermined volume of the gelled negative electrode gathered from the battery is measured, the gelled negative electrode is put into the HSGC glass bottle and is heated by an oven for 45 hours. The sample in the glass bottle is measured under the following same HSGC analysis conditions to determine the amount of benzene contained in the gelled negative electrode by referencing the previously obtained calibration curve. Calculation from the weight of the gathered gelled negative electrode leads to obtainment of the content of benzene per 1 g of the gelled negative electrode. The residual benzene in the gelled negative electrode can be determined up to the limit of determination (approximately 0.02 μg) that HSGC can measure. Benzene contained in the gelling agent itself can be determined by the same manner.

(HS Analysis Conditions)
Measuring instrument: HS40XL manufactured by PerkinElmer Japan Co., Ltd
Heating condition: 70° C. for one hour
Pressing condition: 19 psi for one minute
Injection time: 0.5 minute
Needle temperature: 120° C.
Transfer line temperature: 150° C.
(GC Analysis Conditions)
Measuring instrument: Autosystem XL GC manufactured by PerkinElmer Japan Co., Ltd
Injection port temperature: 250° C.
Injection: split
Carrier gas: He
Control mode: pressure program mode (11.6 psi)
Column: HP-5
Column temperature: 40° C. (five-minute retention) to 300° C. (rate of temperature rise: 30° C./minute)
Detector: FID (detector temperature: 310° C.)

IF benzene cannot be separated from the other components and be determined in HSGC measurement, it can be determined by measurement using a gas chromatography/mass spectrometer (GC/MS). The conditions for GC/MS analysis may be as follows.

(GC/MS Analysis Conditions)
Measuring instrument: GC-QP2010, GCMSQP2010Plus manufactured by SHIMADZU CORPORATION
Injection port temperature: 300° C.
Injection: splitless (one minute)
Carrier gas: He (flow rate: 50 ml/minute)
Control mode: constant linear velocity mode (linear velocity: 36.3 cm/second)
Column: HP-5
Column oven temperature: 40° C. to 300° C. (rate of temperature rise: 30° C./minute)
Ionization method: EI
Mass range: scan mode (m/z=35 to 200)

An aqueous solution of potassium hydroxide containing zinc oxide was used as the alkaline electrolyte in the present embodiment, but the alkaline electrolyte is not limited thereto and may be an aqueous solution containing hydroxide of another alkali metal. For example, for alkaline batteries for light load discharge or for pulse or intermittent discharge, alkaline electrolyte having a comparatively small ratio of potassium hydroxide is suitable. The more the aqueous solution contains moisture, the more liable the alkaline electrolyte separates from the gelled negative electrode. Hence, the effects in the present invention can be exhibited further with such the alkaline electrolyte.

In the present embodiment, the viscosity of the gelled negative electrode is set at the given value (43 to 47 Pa·s) for evaluating the influence of the specific surface area of the zinc powder. The present invention is, however, not limited thereto and can set in the range capable of maintaining excellent filling property in the battery manufacturing process, for example, in the range between 30 and 70 Pa·s, more preferably, between 35 and 55 Pa·s.

As the gelling agent, one containing a cross-linked poly (meth)acrylic acid (or salt) formed by radical polymerization in a non-benzene solvent as a main component is used, but a substance containing another additive may be used, of course. Polymerization is also not limited specifically and may be precipitation polymerization, solution polymerization, bulk polymerization, reverse phase suspension polymerization, or the like.

As described above, lowering of the liquid retention of the gelled negative electrode caused where a gelling agent polymerized in a non-benzene solvent is used might be caused in the reaction process of radical polymerization of monomer having a hydrophilic group. Therefore, there may be used as a gelling agent a cross-linked polymer obtained by radical polymerization of a polymer other than the (meth)acrylic acid (or salt), for example, acrylic esters, such as fumaric acid (or salt), methyl acrylate, ethyl aclyrate, or the like, vinyl alcohols, such as methyl vinyl alcohol, ethyl vinyl alcohol, or the like. Or, any of them may be co-polymerized appropriately.

The zinc powder in the present embodiment has a specific surface area in the range between 0.025 and 0.045 $m^2/g$, more preferably, between 0.03 and 0.04 $m^2/g$, but these values are not necessarily determined from the shape and particle size of the zinc powder. Therefore, the shape and particle size of the zinc powder in the present invention are not limited, and the shape thereof may be nonfinite or porous.

The zinc powder in the present invention can be obtained in such a manner that zinc having a purity of 99.995 or more is heated to approximately 500° C. to be melt and is then gas-injected at high pressure by atomizing, but the present invention is not limited to this method. The zinc powder may be zinc alloy powder containing atoms of indium, bismuth, aluminum, or the like. The use of such zinc allow powder suppresses the progress of zinc's corrosion reaction to prevent a hydrogen gas from being produced.

In the present invention, the non-benzene solvent used as the polymerization solvent for the gelling agent may be, for example, aromatic hydrocarbon, such as toluene, xylene, or the like, but the material thereof is not limited specifically. In a case using a polymerization solvent having strong polarity, however, the growth radical abstracts hydrogen from the methyl group to generate a radical. The radical generated at that time is resonated with the benzene ring to be conjugated and become stable, thereby inviting the chain transition reaction. Consequently, the growth is liable to be stopped to cause less polymerization. In view of this, a low polar or non-polar polymerization solvent is preferable. For example, in a case using a low polar or non-polar hydrocarbon solvent, such as n-hexyne, cyclohexyne, pentane, or the like, the growth radical abstracts hydrogen from electron-denoting alkene, so that the growth is hardly stable. Hence, the chain transfer reaction is caused comparatively less to less stop the growth, thereby suppressing lowering of the polymerization.

Figure 5:
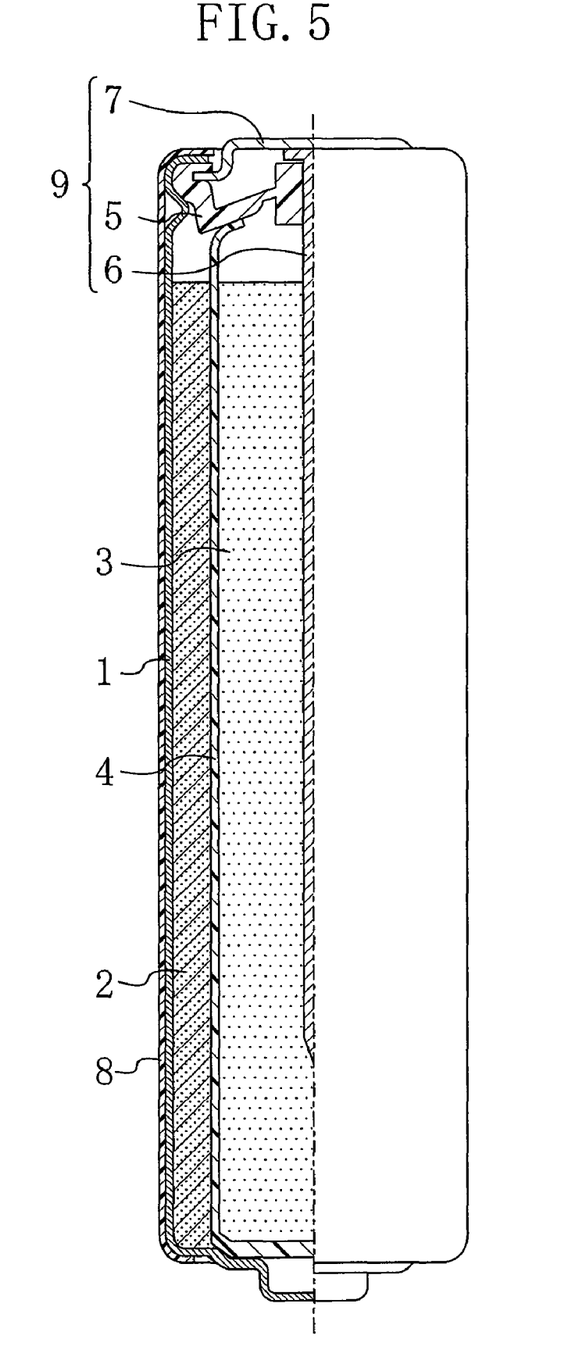
FIG. 5 is a semi-sectional view showing a construction of an alkaline battery in the present invention.

FIG. 5 is a semi-sectional view showing a construction of an alkaline battery including a gelled negative electrode of the present embodiment in the present invention. A positive electrode 2 and the gelled negative electrode 3 are accommodated in a bottomed cylindrical battery casing 1 with a separator 4 interposed. The opening part of the battery casing 1 is sealed with a sealing member 9 as an integration of a gasket 5, a negative electrode terminal rod 6, and a negative electrode terminal plate 7. The outer peripheral face of the battery casing 1 is covered with an outer label 8.

The alkaline battery shown in FIG. 5 can be manufactured by the following manner.

First, a hollowed cylindrical positive electrode mixture pellet 2 containing a positive electrode active material is inserted in the battery casing 1 formed of a steel plate and is pressed to be allowed to adhere to the inner face of the battery casing 1. After the separator 4 rolled in a cylindrical form is inserted inside the positive electrode mixture pellet 2, the alkaline electrolyte is injected inside the separator 4 to wet the separator 4 and the positive electrode mixture pellet 2 with the alkaline electrolyte. Then, the gelled negative electrode 3 is filled inside the separator 4. Subsequently, the negative electrode terminal rod 6 integrated with the gasket 5 and the negative electrode terminal plate 7 is inserted in the gelled negative electrode 3. The opening part of the battery casing 1 is sealed by crimping the opening part of the battery casing 1 to the peripheral part of the negative electrode terminal plate 7 with the gasket 5 interposed. Finally, the outer label 8 is allowed to cover the outer peripheral face of the battery casing 1.

EXAMPLES

The configuration and effects of the present invention will be described further by referencing examples of the present invention, but the present invention is not limited to the examples.

Example A

In order to provide the predetermined viscosity to the gelled negative electrode, a gelling agent (a thickening agent) is added. In general, an adsorbent polymer having a degree of cross-linkage higher than a thickening agent is added to as the gelling agent for additionally providing elasticity and stringing to the gelled negative electrode.

Figure 6:
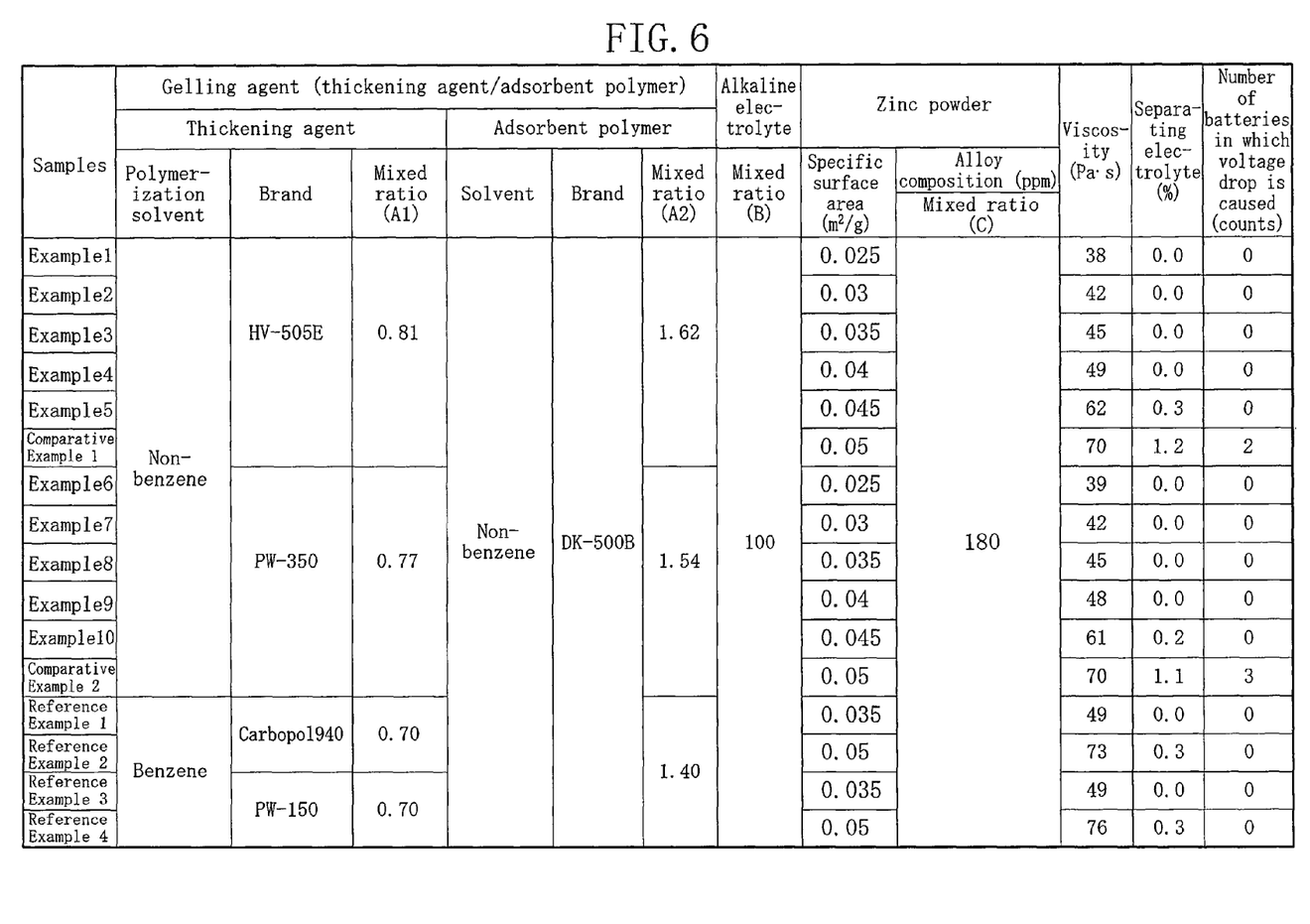
FIG. 6 is a table indicating measurement results of each amount of alkaline electrolyte separating from gelled negative electrodes and each number of batteries in which voltage drop is caused in a drop test of alkaline batteries, wherein the gelled negative electrodes of the alkaline batteries are formed with gelling agents in Embodiment A of the present invention.

FIG. 6 indicates measurement results of each amount of the alkaline electrolyte separating from gelled negative electrodes and each number of batteries in which voltage drop is caused in a drop test of alkaline batteries, wherein the gelled negative electrodes of the alkaline batteries were formed with gelling agents obtained by further adding an absorbent polymer to thickening agents. The same thickening agents, the same alkaline electrolyte, and the same zinc powder as those indicated in FIG. 4 were used, and the same method in FIG. 4 was employed for the measurement. As the absorbent polymer, commercially available DK-505B manufactured by Sanyo Chemical Industries, Ltd. was used.

As indicated in FIG. 6, a slight amount of the alkaline electrolyte separated in samples (Examples 5 and 10) in which the gelled negative electrodes are formed by using the thickening agents polymerized in the non-benzene solvents and in which the zinc powder has a specific surface area of 0.045 $m^2/g$. The amount of the separating alkaline electrolyte is 1% or more in samples (Comparative Examples 1 and 2) in which the zinc power has a specific surface area of 0.05 $m^2/g$. Voltage drop was caused in Comparative Examples 1 and 2 in the drop test to cause internal short-circuit. These results are the same as those in FIG. 4.

In samples (Reference Examples 2 and 4) in which the zinc powder has a viscosity of 70 Pa·s or more and in which the gelled negative electrodes formed by using the thickening agents polymerized in the benzene solvents, a slight amount, 0.3% of the alkaline electrolyte separated. This might be because the specific surface area of the zinc powder is large, 0.05 $m^2/g$.

Example B

In the present invention, the specific surface area of the zinc powder is set within a predetermined range to suppress lowering of the alkaline electrolyte retention. This range of the specific surface area is set lower than the range of the specific surface area set for a gelled negative electrode to which a conventional gelling agent polymerized in a benzene solvent is added.

The smaller the particle size of the zinc powder is, the higher the reaction efficiency is. Accordingly, the large current discharge characteristics of a battery can be enhanced as the particle size thereof is small. In contrast, the specific surface area of the zinc powder increases as the particle size thereof is small. Namely, suppression of lowering of the alkaline electrolyte retention and improvement on the large current discharge characteristics fall in a trade-off relationship.

Formation of zinc alloy powder by adding aluminum to zinc exhibits an effect of smoothing the surface of the zinc alloy powder. Accordingly, the particle size of the zinc alloy powder to which aluminum is added is smaller where the specific surface areas are the same.

In order to improve the corrosion resistance of zinc, a zinc alloy obtained by adding bismuth to zinc is used. Bismuth is, however, liable to be segregated at the grain boundaries of the zinc alloy, and therefore, addition of more than a given amount of bismuth leads to intersperse of segregated bismuth on the surface of the zinc alloy powder to rough the surface thereof. For this reason, the added amount of bismuth must be limited to an extent that such an effective specific surface area does not increase.

Figure 7:
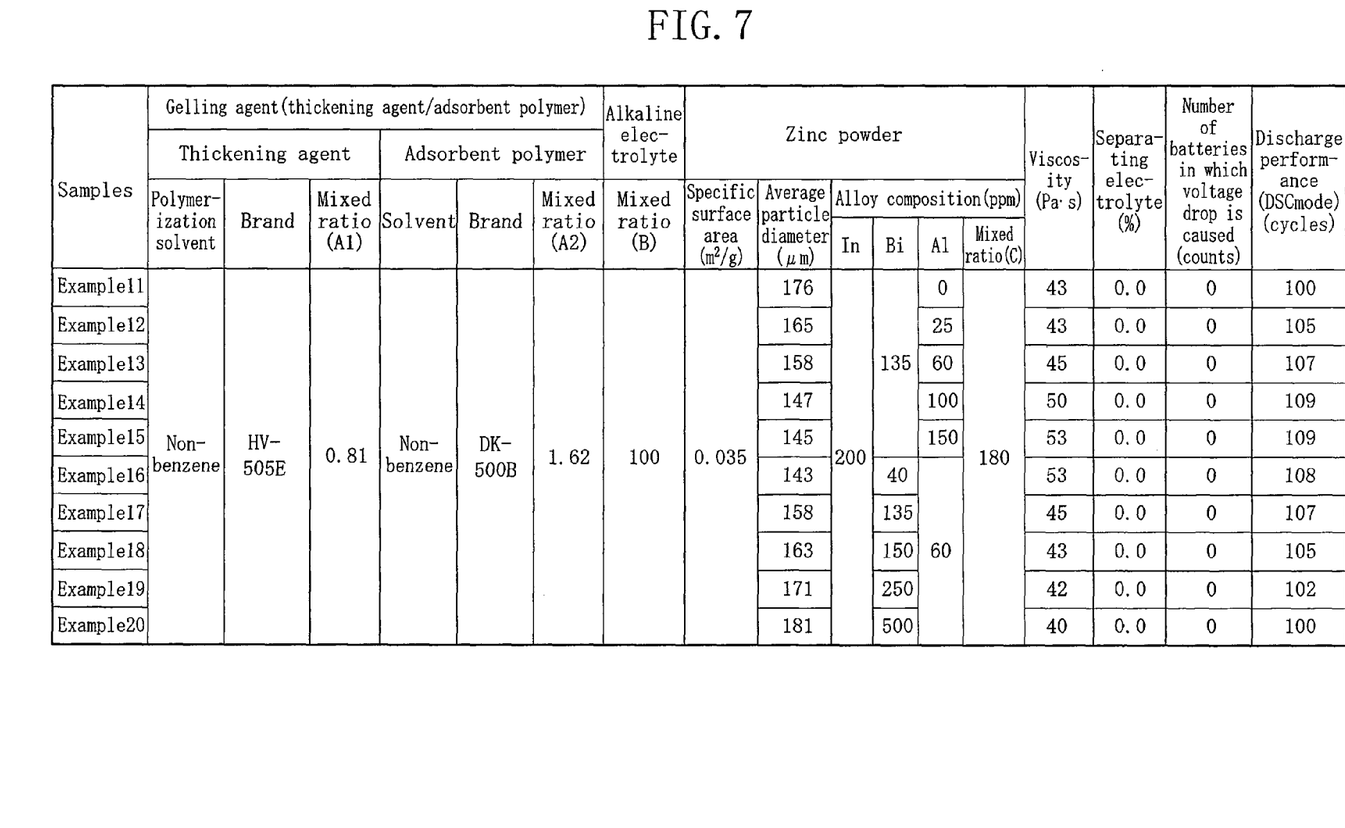
FIG. 7 is a table indicating measurement results of each amount of alkaline electrolyte separating from gelled negative electrodes, each number of batteries in which voltage drop is caused in a drop test of alkaline batteries, and each of the discharge characteristics of the alkaline batteries, wherein the gelled negative electrodes of the alkaline batteries are formed with zinc alloy powders in Embodiment B of the present invention.

FIG. 7 indicates measurement results of each amount of the alkaline electrolyte separating from gelled negative electrodes, each number of batteries in which voltage drop is caused in a drop test of alkaline batteries, and each of the discharge characteristics of the alkaline batteries, wherein the gelled negative electrodes of the alkaline batteries were formed with zinc alloy powders obtained by adding indium, aluminum, and bismuth to zinc. The same gelling agent (thickening agent and adsorbent polymer) and the same alkaline electrolyte as those indicated in FIG. 6 were used, and the same methods in FIG. 6 were employed for measuring each amount of the separating alkaline electrolyte and each number of batteries in which voltage drop is caused. To measure the discharge characteristics, the number of cycles accumulated until a battery reached 1.05 V was counted when ten cycles of pulse discharge (in DSC mode) per one hour were prepared, wherein one cycle of the pulse discharge was discharge at 1.5 W for two seconds and discharge at 0.65 W for 28 seconds. As to the average particle diameters of the zinc alloy powders, each volume particle size distribution was measured by laser diffraction type HELOS & RODOS manufactured by Sympatec GmbH (distribution pressure is 3.0 bar and used range is R4), and 50% of each resultant accumulation was employed as the average particle diameter.

As indicated in FIG. 7, when the specific surface area was set at a given value (0.035 $m^2/g$), an increase in added amount of aluminum could reduce the average particle diameter of the zinc alloy powder, with a result that the discharge characteristics of the battery could be improved with the alkaline electrolyte retention maintained. FIG. 7 proves that such effects can be obtained effectively by setting the added amount of aluminum within the range between 25 and 100 ppm (Examples 12 to 14). Even when the added amount of aluminum is 150 ppm (Example 15), the discharge characteristics were improved. An excessive increase in added amount of aluminum, however, reduces the amount of alloy relatively to lower the discharge capacity of the battery.

Further, as indicated in FIG. 7, when the specific surface area was set at a given value (0.035 $m^2/g$), reduction in amount of bismuth could reduce the average particle diameter of the zinc alloy powder, with a result that the discharge characteristics of the battery when the added amount of aluminum is 60 ppm could be maintained with the alkaline electrolyte retention maintained. It is understood from the results in FIG. 7 that such effects can be obtained effectively by setting the added amount of bismuth within the range between 40 and 150 ppm (Examples 16 to 18). When the added amount of bismuth is smaller than 40 ppm, the effect of zinc's corrosion resistance reduces.

Example C

When the specific surface area of the zinc powder is small, the number of the contact points between the zinc particles reduce to weaken the network among the particles, thereby inviting degradation of the discharge characteristics.

The adsorbent polymer added to the gelling agent, which exhibits effects of providing elasticity and stringing to the gelled negative electrode, has high swelling property. The adsorbent polymer swelled to have a large particle diameter can exhibit an effect of strengthening the network among the zinc alloy powders.

Figure 8:
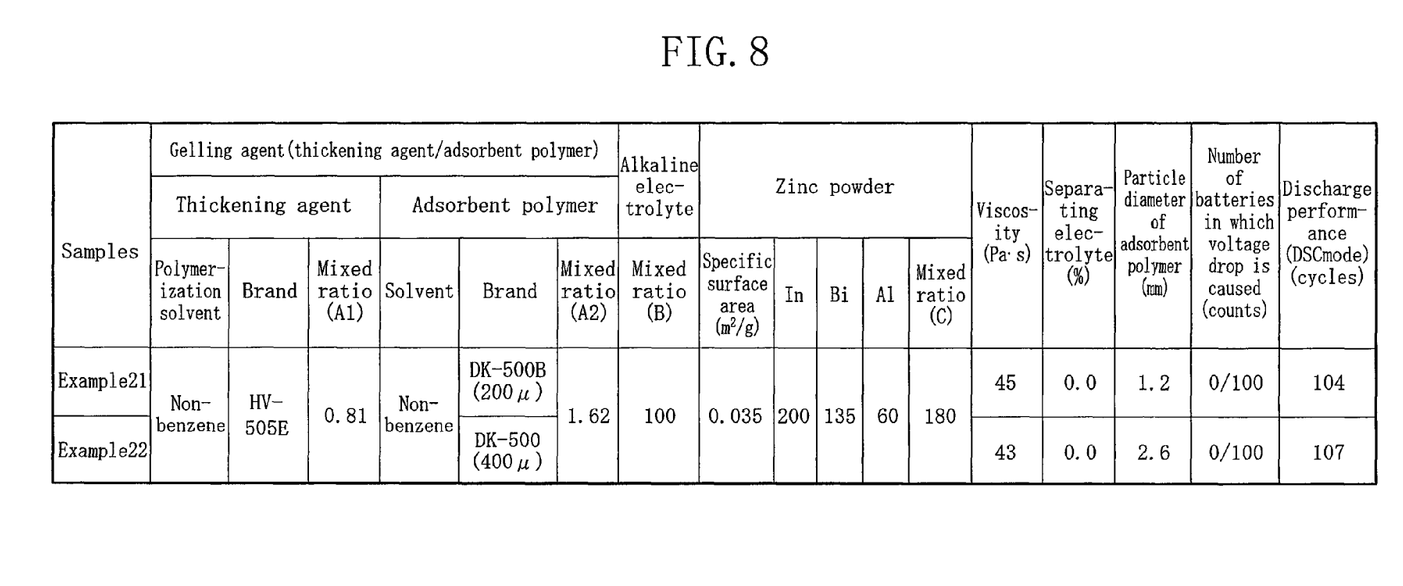
FIG. 8 is a table indicating measurement results of each amount of alkaline electrolyte separating from gelled negative electrodes, each number of batteries in which voltage drop is caused in a drop test of alkaline batteries, and each of the discharge characteristics of the alkaline batteries, wherein the gelled negative electrodes of the alkaline batteries are formed with gelling agents in Embodiment C of the present invention.

FIG. 8 shows measurement results of each amount of the alkaline electrolyte separating from gelled negative electrodes, each number of batteries in which voltage drop is caused in a drop test of alkaline batteries, and each of the discharge characteristics of the alkaline batteries, wherein the gelled negative electrodes of the alkaline batteries were formed with gelling agents containing swelled adsorbent polymers. The same gelling agent (thickening agent and adsorbent polymer) and the same alkaline electrolyte as those indicated in FIG. 7 were used, and the same methods as in FIG. 7 were employed for the measurement. The particle diameter of the adsorbent polymer can be measured under a stereomicroscopic microscope with an XY stage capable of measuring the distance and coordinates of adsorbent polymer particles after a gelled negative electrode is taken out by decomposing the alkaline batteries and is subjected to centrifugal separation to separate the adsorbent polymer (in a particle form remaining due to insolubility) and the thickening agent (incapable of being separated due to solubility). Each value in FIG. 8 is an average in arbitrary ten batteries.

As indicated in FIG. 8, when the adsorbent polymers swelled to have particle diameters of 1.2 and 2.6 mm were added to the gelling agent (Examples 21 and 22), the discharge characteristics of the batteries were improved with the alkaline electrolyte retention maintained.

Heretofore, preferred embodiments of the present invention have been described, which do not serve as any limitation, and various modifications are possible, of course.

What is claimed is:

1. A gelled negative electrode for an alkaline battery, comprising: zinc powder, alkaline electrolyte, and a gelling agent, wherein
   the gelled negative electrode contains, as a main component, a cross-linked polymer formed by radical polymerization in a non-benzene solvent, and
   the zinc powder has a specific surface area in a range between 0.025 and 0.045 $m^2/g$.

2. The gelled negative electrode of claim 1, wherein
   the gelling agent contains, as a main component, a cross-linked poly(meth)acrylic acid (or salt) formed by radical polymerization of a (meth)acrylic acid (or slat) in a non-benzene solvent.

3. The gelled negative electrode of claim 1, wherein
   the specific surface area of the zinc powder is in a range between 0.03 and 0.04 $m^2/g$.

4. The gelled negative electrode of claim 1, wherein
the non-benzene solvent is a low-polar or non-polar hydrocarbon-based solvent.

5. The gelled negative electrode of claim 4, wherein
the low-polar or non-polar hydrocarbon-based solvent is made of at least one kind of material selected from a group consisting of n-hexane, cyclohexane, and pentane.

6. The gelled negative electrode of claim 1, which has a viscosity in a range between 30 and 60 Pa·s.

7. The gelled negative electrode of claim 1, wherein
the zinc powder contains aluminum in a range between 25 and 100 pm.

8. The gelled negative electrode of claim 1, wherein
the zinc powder contains bismuth in a range between 40 and 150 ppm.

9. The gelled negative electrode of claim 1, wherein
the gelling agent contains an adsorbent polymer swelled to have a particle diameter in a range between 1.2 and 2.6 mm.

10. The gelled negative electrode of claim 2, wherein
the cross-linked poly(meth)acrylic acid (or salt) is obtained by precipitation polymerization.

11. An alkaline battery, comprising a gelled negative electrode according to claim 1.

12. An alkaline battery comprising a gelled negative electrode including zinc powder, alkaline electrolyte, and a gelling agent, wherein
the gelled negative electrode contains no benzene, and
the zinc powder has a specific surface area in a range between 0.025 and 0.045 $m^2/g$.

13. The alkaline battery of claim 12, wherein
the gelling agent contains, as a main component, a cross-linked polymer formed by radical polymerization in a non-benzene solvent.

14. The alkaline battery of claim 13, wherein
the gelling agent contains, as a main component, a cross-linked poly(meth)acrylic acid (or salt) formed by radical polymerization of a (meth)acrylic acid (or slat) in a non-benzene solvent.

* * * * *